UNITED STATES PATENT OFFICE.

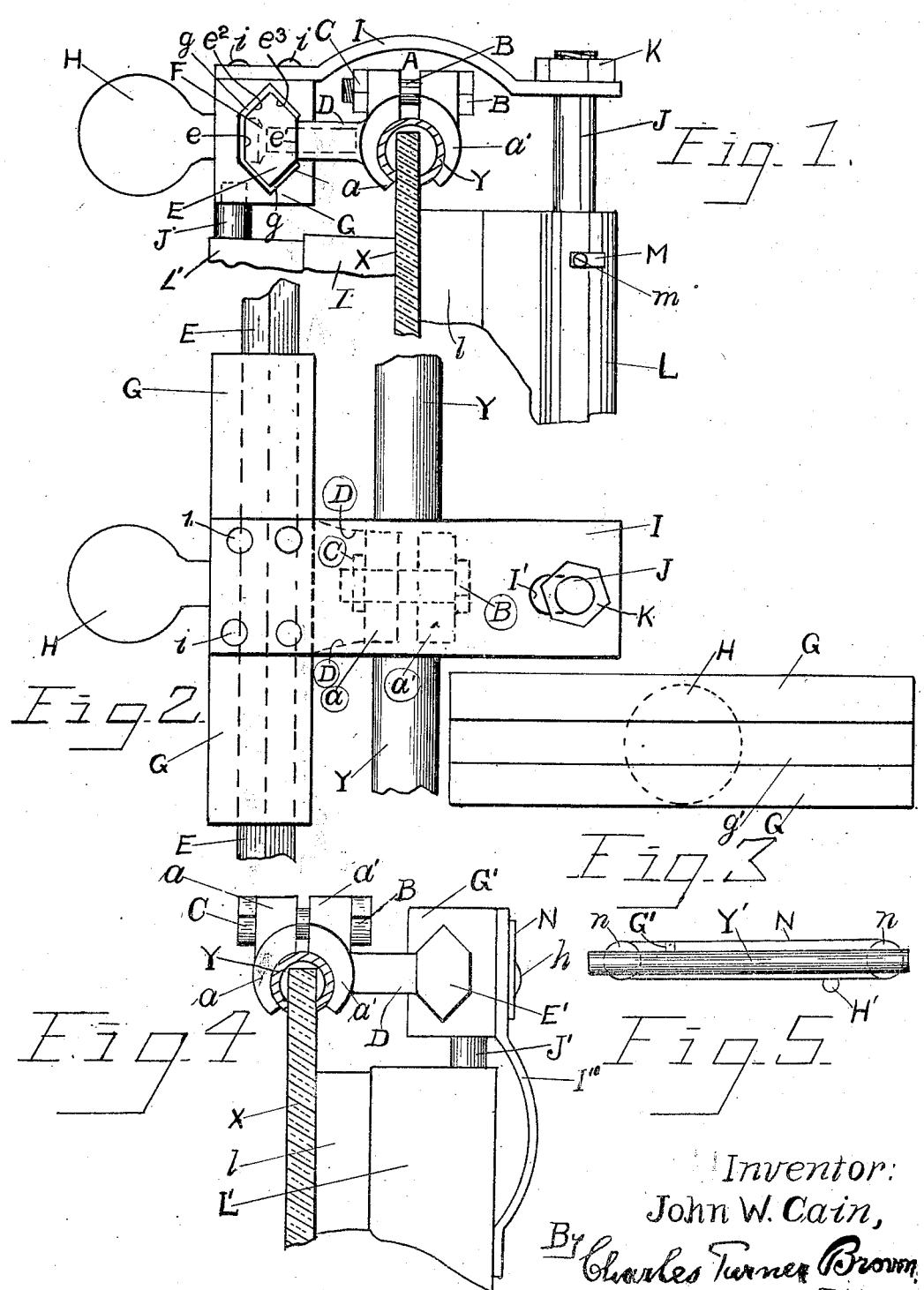

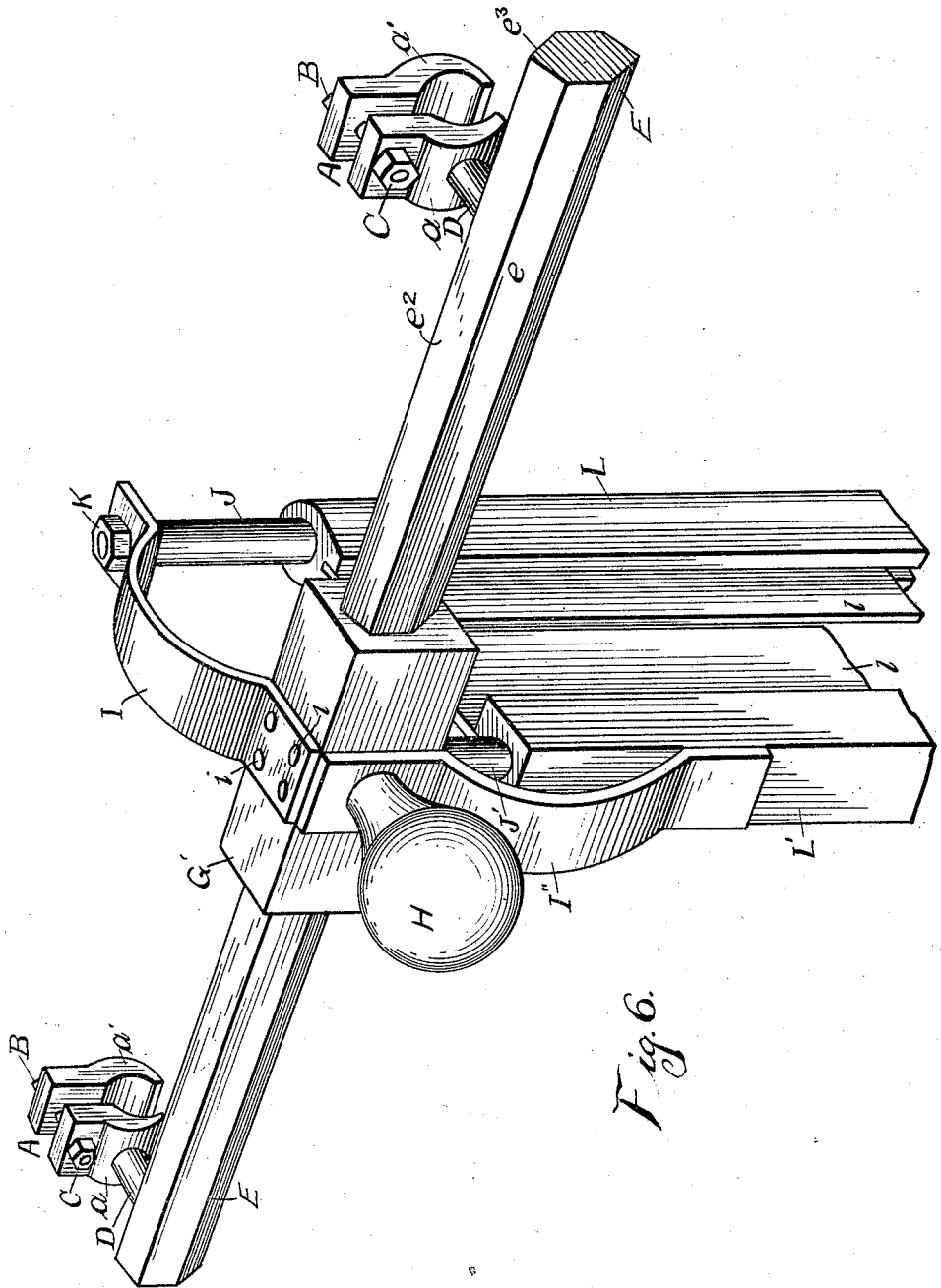

JOHN W. CAIN, OF CHICAGO, ILLINOIS.

WINDSHIELD-WIPER FOR VEHICLES.

1,378,090.  Specification of Letters Patent.  Patented May 17, 1921.

Application filed July 29, 1918. Serial No. 247,129.

*To all whom it may concern:*

Be it known that I, JOHN W. CAIN, a citizen of the United States, and a resident of Chicago, in the county of Cook and State of Illinois, have invented certain new and useful Improvements in a Windshield-Wiper for Vehicles, of which the following is a specification.

This invention relates to wipers which are primarily designed for and adapted to be attached to wind shields of automobiles, for the purpose of being manually operated to clean the glass of said wind shield, when mud, dirt, snow or water is deposited thereon.

And the objects of the invention are to obtain a device of the kind named which is attachable to the wind shield of a touring body, limousine body or a truck; to obtain a device easily operable, not liable to get out of order or break, and readily understood by chauffeurs and others who drive automobiles.

Additional objects are disclosed by the specification and drawing.

The manner in which I am able to attach the device either to a touring body where the wind shield is independent of the top and sides of the car, to a limousine where the windshield is built into the body of the car, or to a truck where the wind shield is inclosed in a wooden frame somewhat similar to a limousine body, is by making what I term reversible clamp members and track holders which I hereinafter definitely describe.

I have illustrated a wiper embodying my invention in the drawing accompanying and forming a part hereof in which, Figure 1, illustrates in vertical section a small part of the wind shield of a touring body car, and a device embodying this invention mounted thereon, with the track of the device back of the wind shield and the wiper in front thereof.

Fig. 2, a top plan view of the several members which are illustrated in Fig. 1.

Fig. 3, a front of a sliding member forming an element of the device, and

Fig. 4, a like view as Fig. 1, with the device embodying the invention attached to the frame of the wind shield of a truck, and having the track and wiper in front of the shield.

Fig. 5 is a diagrammatic view illustrating the attachment to a wind shield of the modification which is illustrated in Fig. 4.

Fig. 6 is a perspective of a device embodying the invention.

A reference character applied to designate a given part indicates said part throughout the several figures of the drawing, wherever the same appears.

X, represents the glass of a wind shield, and Y, the frame thereof.

A, represents a clamp of which a plurality are used, respectively consisting of members $a$, $a'$, the bolt B and nut C. Member $a$ is provided with a lug D, which is illustrated as integral therewith. E represents a rod having parallel sides $e$ $e'$ and the sides $e^2$, $e^3$. The side $e'$ of rod E, is brought into contact with the end of lug D and said rod is rigidly secured to said end by a screw, (F), which is indicated in Fig. 1. G, represents a sliding block which is provided with a groove extending longitudinally therethrough which corresponds with the rod E, so that said block G may be and is slidably mounted on the rod E, said rod thereby forming a track for said block. The groove in block G, preferably has the sides thereof which come in contact with faces $e$, $e^2$ and $e^3$ lined with bronze, Babbitt metal, or the like, as is indicated at $g$, Fig. 1. The width of the opening, ($g'$), of the groove in block G is shown in Fig. 3, and this opening is sufficiently wide to permit the lug D to enter and pass through said groove, thereby allowing the sliding block G to pass by said lug. This construction permits the clamps to be placed at any point, endwise, on the wind shield frame, and allows the sliding block to be moved the entire length of the track and wind shield. H, Figs. 1, 2, 3, and H', Fig. 5, represent handles, by means of which the sliding block G, in said Figs. 1, 2, 3, and G' in Figs. 4 and 5 are moved on tracks E, E', which form the runways for said blocks.

I, Figs. 1, 2 and 6, represents a member which is provided with slot I' and is rigidly secured to block G, as by the bolts or rivets $i$, $i$. Member I is preferably of spring metal. I'' represents a member which is secured at one of its ends to one face of block G' ( as by rivet $h$, Fig. 4, or handle H, Fig. 6), and at its other end yieldingly presses against the edge of wiper L'. J represents a vertical rod which is illustrated in Figs. 1, 2 and 6, as firmly secured at one end of member I, by extending it through slot I' and turning nut K down thereonto. J' represents a vertical rod secured to the under side of block G′, Figs. 4 and 6, and in Fig. 1 as secured to block G, by extending it into said blocks.

L, Fig. 1, represents a wiper comprising the flexible scraper 1, which contacts with the glass X of the wind shield, and the body which extends around the rod J. M represents a slot in the portion of wiper L which is so mounted on the rod J, and m a pin in said slot, said pin being driven into said rod. The swing or rocking of the wiper on said rod is limited by said pin and slot.

In Fig. 4 the member I″, (being of resilient material as in Figs. 1 and 2), is secured to block G′, (handle H being removed from said block), as by the rivet h; and N indicates, (Figs. 4 and 5), a strap or cable, which also is secured to said block, as by said rivet h. In Fig. 4, the track E′ and the wiper L′ are on the same side of the wind shield, and the cable N extends around pulleys n, n, which are set in frame Y′, (as indicated in the diagram, Fig. 5), said frame being of wood and built above and on the sides of the wind shield, as is usual in truck construction.

To wipe a window glass of a wind shield it is simply necessary to grasp handle H, (illustrated in Figs. 1, 2 and 6), or handle H′, (Fig. 5), and move the sliding blocks on the tracks which are provided therefor, as hereinbefore described.

In the constructions illustrated the members I, and I″ being of resilient material, hold the wipers, (L, L′), against the glass of the wind shield substantially the entire length of the flexible scrapers thereof.

The slot I′, Figs. 1 and 2, in member I, permits adjustment of rod J to and from the glass X, before setting nut K down on said member.

I claim:—

1. In a wiper for wind shields, in combination, clamps adapted to grip a wind shield frame, each comprising a plurality of members, a projecting lug on one of said members of each clamp, a track, means to secure said track to said lugs, a block slidably mounted on said track, said block provided with an undercut groove therein corresponding in cross section with the cross section of said track, the open side of said groove being adapted to pass said lugs, said clamps and lugs arranged to position said track to one side of said frame, a member on said slidable block extending over said frame to the other side thereof, a rod secured to the end of said member, and a wiper mounted on said rod.

2. In a wiper for wind shields, in combination, clamps adapted to grip a wind shield frame, projecting lugs on each of said clamps, a track, means to secure said track to said lugs with one of the sides of said track contacting with said lugs, a block provided with an undercut groove therein corresponding in cross section with the cross section of said track, and slidably mounted thereon, the open side of said groove being adapted to pass said lugs, and said lugs arranged to position said track to one side of said frame, vertical rods, wipers thereon and means to secure said rods to said block.

JOHN W. CAIN.

In the presence of—
CHARLES TURNER BROWN,
J. SCUDDER.